Figure 1:
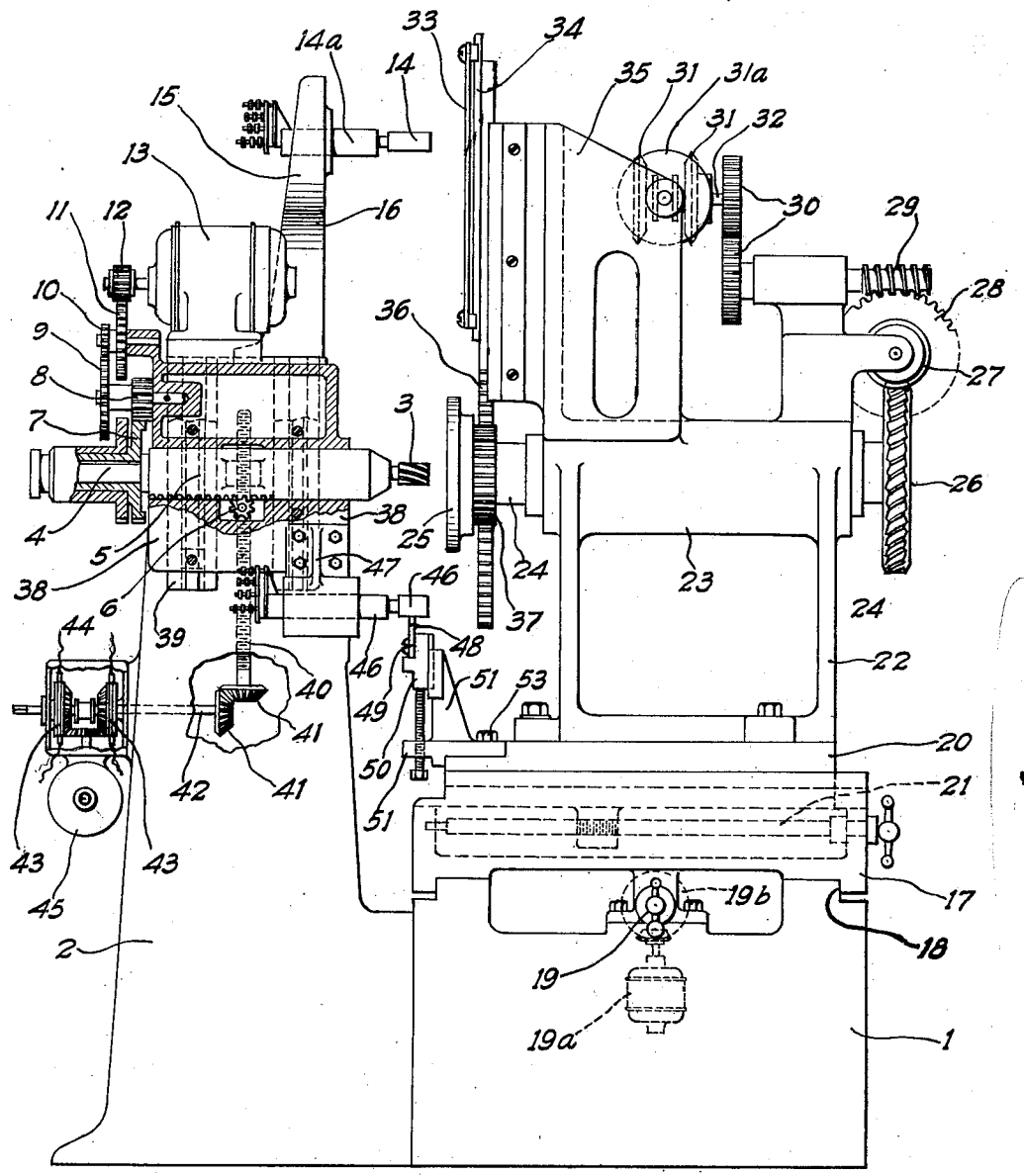

Aug. 22, 1933.      J. C. SHAW ET AL      1,924,003
CAM CUTTING MACHINE COMPENSATING MEANS
Filed Sept. 15, 1931      3 Sheets-Sheet 2
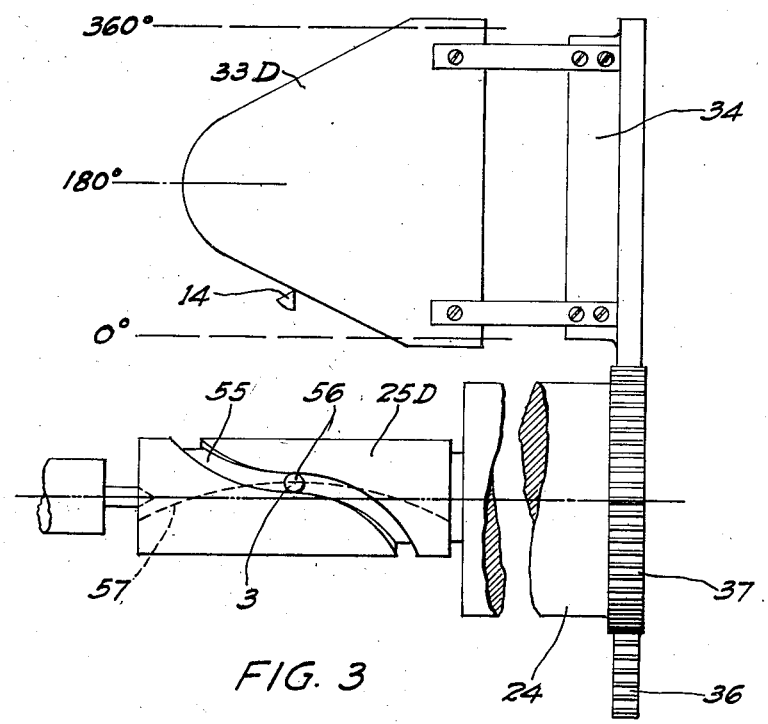
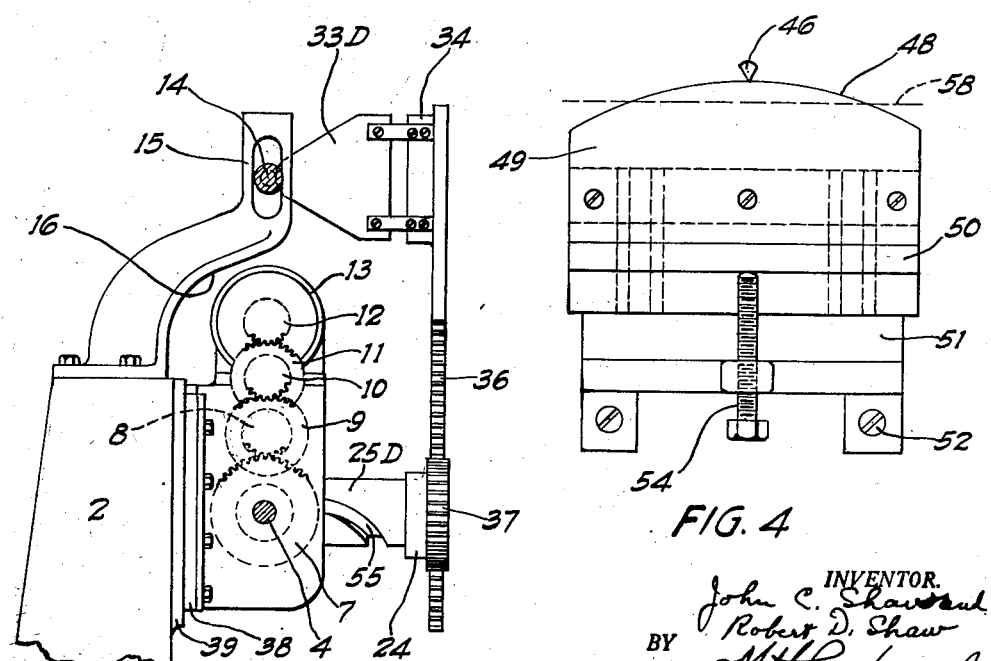

Patented Aug. 22, 1933

1,924,003

UNITED STATES PATENT OFFICE 1,924,003

CAM CUTTING MACHINE COMPENSATING MEANS

John C. Shaw and Robert D. Shaw, Brooklyn, N. Y., assignors to Pratt & Whitney Company, Hartford, Conn., a Corporation of New Jersey Application September 15, 1931
Serial No. 562,968

9 Claims. (Cl. 90—13.7)

This improvement relates primarily to compensating means adapted for operation in conjunction with cam cutting machines for cutting cams so that they will properly operate when the cam followers or rollers are mounted on the free ends of pivoted radius arms so that during operation they move in arcuate paths.

In cam cutting machines of the character described in Shaw Patent No. 1,719,813 of July 2, 1929, means is provided for cutting cams, either edge, face, or drum cams, from a template or pattern, representing the desired cam path in developed form, and adapted to be moved in synchronism with the rotation of the cam blank, so that the cam or cam groove is cut on or in the cam blank in accordance with the pattern of the cam represented on the template.

The cam follower or roller is usually or at least, frequently supported on a pivoted radius arm and consequently in drum cams any cam path cut with a cylindrical mill or cutter in the usual way will not properly register with the face of the roller in all positions of the radius arm during the rotation of the cam. The usual method of correcting this condition is to undercut the walls of the cam path and/or use a ball-shaped follower roller. Such subterfuges are inadequate in that the contact surfaces between the roller and the face of the cam path is so greatly reduced that excess wear becomes a factor in the life and accuracy of the cam. In addition to the improper contact of a roller with a drum cam that has not been compensated there is definite error introduced due to the arcuate path taken by the cam roller during rotation of the cam. Applicants therefore actuate the cutter during its operation upon the cam so that its position will correspond at all times to the positions assumed by the cam roller during use of the cam. Consequently the present improvement has been devised as a satisfactory means for combining compensating means with the cutting of the cam for compensating for all positions of the cam roller when the latter is pivotally mounted on a radius arm or lever of any predetermined length.

The object, therefore, of the present improvement is to provide compensating means operating automatically to shift the position of the cutter during the cam cutting operation so that the successive positions of the cutter are the positions assumed by the cam follower roller as it swings or changes position relative to the axis of the cam blank while swinging with the radius arm, upon which the roller may be mounted.

In the cam cutting machine of the Shaw patent, referred to, the cam blank is rotated in synchronism with a template or pattern cooperating with an electric tracer operating through magnetic clutches for controlling the relative position of the cam blank and cutter in accordance with the pattern or template. This patented machine cuts a cam theoretically correct only for a cam roller moving in a straight line parallel to the axis of a drum cam or moving radially of an edge or face cam.

During the operation of cutting a cam on the machine shown in the above referred to patent, the tracer follows the pattern on the edge of the template and there is a corresponding relative movement between the cutter and the cam blank, (effected by magnetic clutches) as the cutter cuts a path in the cam blank for the cam follower or roller. If the cam follower or roller is mounted on a supporting member reciprocating in a straight line, there will be no occasion for any compensation for the angular position of the cam roller will remain the same throughout and will be the same as for the cutter of the machine cutting the cam, and accordingly the face of the cam path will be parallel with and cooperate with the full width of the face of the roller, in all positions. However, when the cam roller or follower is mounted on a radius arm, its position or relation to the axis of the cam varies and it becomes necessary, in order to compensate for the change in angular position of the radius arm, to provide for bodily shifting the axial position of the cutter relative to the axis of the cam, in order that the cutter may assume or occupy the same positions the cam follower or roller will occupy during the entire swinging cycle of the supporting radius arm.

This compensation is obtained in the present construction of applicants by a supplementary template, the main template being used for cam rollers having a corresponding path but operating on arms of any radius or in a straight line. The supplementary template has an arcuate outline of the same radius as that of the lever for the roller designed to be used with the cam.

It is quite possible to provide for compensation of this character by mechanical means, but such devices are ordinarily not satisfactory, because of mechanical limitations. Therefore, a further object of the present improvement is to provide means operative during the cam cutting operation, but independently thereof, for automatic compensation for the radius arm. This compensating means provides for utilizing an auxiliary electric tracer similar to the tracer described in the above Shaw patent, and adapted to follow the peripheral edge of an arcuate template with a curved edge generated according to the radius arm on which the cam roller is to operate. The radius arm template is mounted in fixed relation to the cam blank, while the auxiliary tracer for cooperation therewith is mounted in fixed relation to the cutter, so that the relative motion therebetween is the same as the relative motion between the cutter and the cam blank during the cam cutting operation, which latter motion is under the control of the tracer following the cam pattern or template. For this purpose, the cutter is mounted on a slide or a carriage operated by suitable magnetic clutches for motion in a plane at right angles to the relative reciprocating motion just referred to, as taking place under the control of the cam cutting template or pattern.

This compensating means provides a novel control for automatically displacing the cutter transversely relative to the axis of the cam blank, so that the cutter will successively assume the various positions occupied by a follower roller on a radius arm of predetermined radius, if the radius arm template is generated with the same radius as the radius arm.

Obviously, this improvement permits cutting from the same cam template, cams for a wide variation in the radius arms, for all that is required is to simply change the radius arm template to correspond with the radius of the radius arm of the cam roller, without any change in the cam cutting control mechanism, the arrangement at the same time being adapted for various sizes of cams and various sizes of cam followers, the latter because the diameter of the cutter obviously, may be changed to conform to the diameter required for the cam follower. The main template remains the same for any predetermined result and movement whether the cam roller operates in a straight line or in an arc of any radius. Also this template is developed as if for a cam roller operating upon a straight line parallel to the axis of a drum cam or radial of a face or edge cam as the case may be.

In the Shaw Patent No. 1,719,813, above referred to, a single purpose machine is described, the arrangement being such that by shifting the position of the cam blank spindle either face and edge cams or drum cams may be cut. The present improvement is adapted to be utilized in connection with and as an additional adjustment in parts of such a single purpose machine, although, obviously, it is not limited to machines of that character.

When the cam follower or roller for an edge cam is mounted on a radius arm for cooperation with the edge of the cam, there is not the same necessity for compensation for the arcuate movement of the cam roller, because the face of the roller will, at all times, remain parallel with the face of the cam and the same is substantially true with face cams. For accurate functioning of either type of these cams, it is desirable to lay out the cam according to the motion required of a cam roller having straight line movement and cut the cam with the radius arm compensating means for the radius on which the roller is to operate, so as to preserve the accuracy of operation desired. The compensating means, furthermore, provides for cutting cams from the same pattern for use with cam rollers on radius arms of different lengths.

With the cutting of drum cams, however, the problem is much more complicated, if the cam follower or roller is mounted on a radius arm, because any shifting of the cam roller, above or below the plane of the axis of the drum cam will change the relative positions of the face of the roller to the face or wall of the cam groove. Consequently, the present improvement is particularly adapted for cutting cams compensating for the use of radius arms in connection with drum cams.

Figure 5:
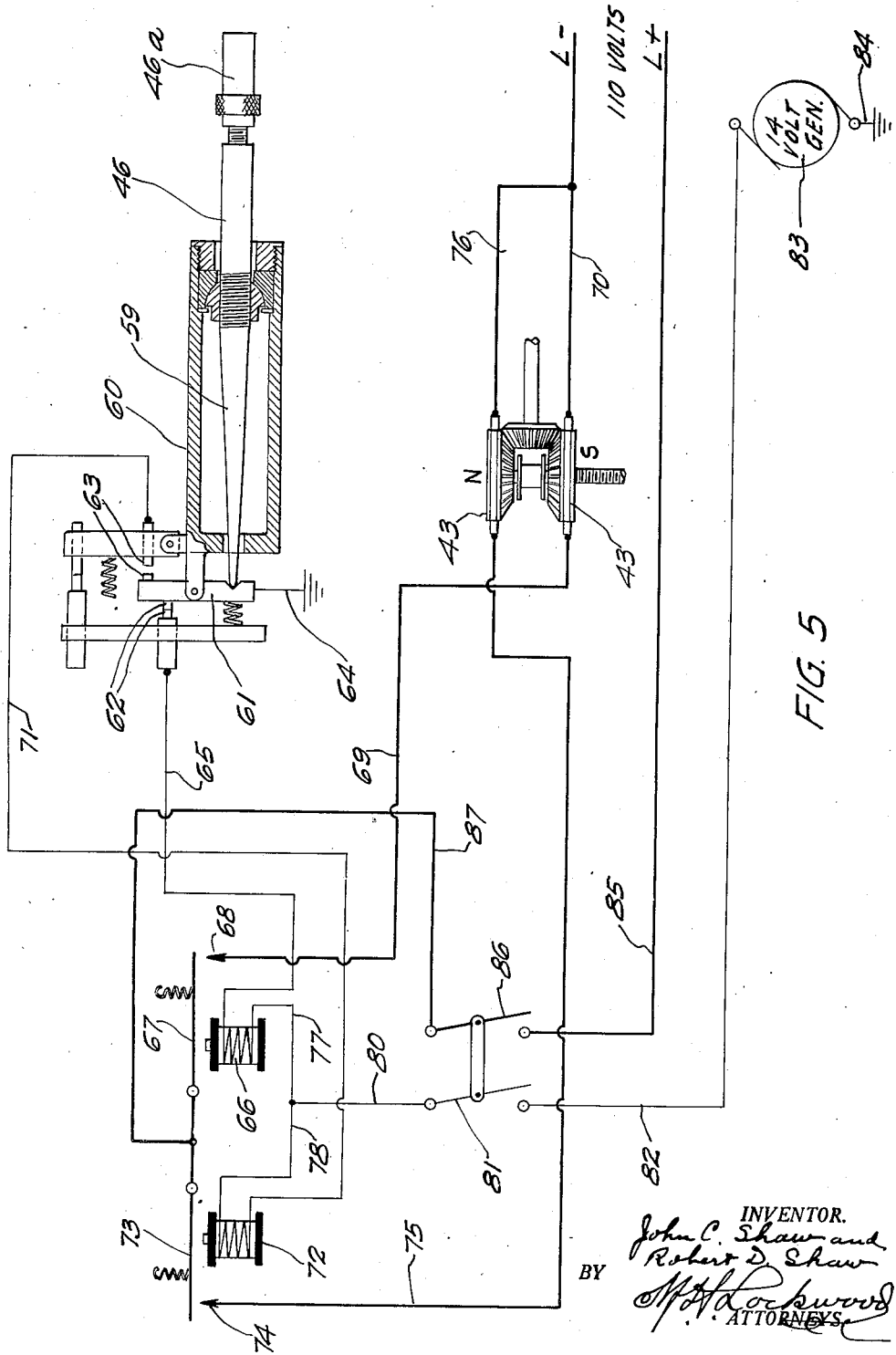

The improvement will be described in connection with the following drawings, in which Fig. 1 shows an end view of one form of an electrically controlled cam cutting machine, provided with the compensating means also electric tracer controlled, certain parts of the machine being shown in section; Fig. 2 shows a front view of the broken away upper end of the pier supporting the cutter and tracer, the cam template and cam blank being shown for the cutting of a drum cam; Fig. 3 is an enlarged broken away detail of the cam cutting template and the drum cam blank, with a dotted line indicating the path of the cam roller or arm of the radius arm supporting the cam roller; Fig. 4 shows the radius arm template or arcuate template and its support, with which the auxiliary tracer of the compensating means cooperates, and Fig. 5 is a wiring diagram indicating the arrangement for control of the positions of the cutter by the auxiliary tracer of the compensating means.

Referring to the drawings and particularly to Fig. 1, it will be seen that the cam cutting machine described in the Shaw patent, above referred to, is represented as being modified to a limited extent for the incorporation therewith of the improved compensating means. The cam cutting machine is mounted upon a base 1, extending longitudinally and provided, on the front side, with an upwardly extending pier 2 upon which the rotary cutter 3 for cutting the cam is supported on a spindle 4, rotatably mounted in an adjustable bearing support 5, adapted by means of the rack and pinion connection 6 to be adjusted longitudinally for positioning the cutter relative to the cam blank.

Gears 7, 8, 9, 10, 11 and 12 connect the cutter spindle 4 with an electric motor 13 for direct drive of the spindle, the gears being preferably change gears, so as to provide for any desired speed for the cutter.

On the pier 2 and extending above the cutter 3 in the same vertical plane, there is mounted a well known form of electric tracer 14, mounted in a tracer body 14a and supported in fixed position at the upper end of a bracket 15, mounted on the upper end of the pier 2, as shown in Figs. 1 and 2. The bracket 15 in the present instance, is curved or off-set at 16 (see Fig. 2) so that the bracket may be mounted on the top of the pier to one side of the mounting for the cutter, and yet have the upper end bent over into line with the axis of the cutter so that the tracer and cutter shall be in the same vertical plane.

In order to cut the cam path or groove in the cam blank according to a pattern or template and under the control of the electric tracer, it is necessary to provide for relative motion between the tracer and cutter on the one hand and the template and cam blank on the other. Obviously, either the support for the tracer and cutter or the support for the template and cam blank may be moved, but in the form of machine shown in Shaw patent above referred to, the cutter 3 and tracer 4 are mounted on a fixed support in a vertical plane and the cooperating template and cam blank are mounted on a table or slide for horizontal motion at right angles to the plane of the tracer and cutter for cutting the cam under the control of the tracer.

In order to provide for the cam cutting tracer controlled motions and for the various adjustments to bring the parts into proper cooperative relation, a longitudinally movable slide or carriage 17 is mounted on slide-ways 18, on the upper face of the base 1 and a lead screw 19 is provided for the longitudinal movement. The screw 19 as shown in the Shaw patent, is operated by a motor 19a driving magnetic clutches 19b which are under the control of the tracer 14, substantially as described in the patent.

A transversely movable carriage 20 is mounted to slide on suitable ways on the carriage 17 and a transversely extending lead screw 21 is provided for giving motion to the carriage 20 for adjusting it toward or from the cutter and tracer at right angles to the direction of motion of the carriage 17. A bracket 22 is mounted upon the transverse carriage or table 20 and this bracket is provided with a bearing 23 supporting a spindle 24, upon the front end of which a cam blank 25 is adapted to be mounted. The cam blank spindle 24 is adapted to be rotated during the cutting of the cam and for this purpose is provided with a worm wheel 26 driven from a worm 27, which in turn, is adapted to be driven by a gear 28 and worm 29 and suitable gears 30 from a pair of magnetic clutches 31 adapted to be rotated by a motor 31a and to rotate a shaft 32 and gears 30 in either direction, as described in the Shaw patent.

Any suitable form of cam pattern or template may be provided for simultaneous rotation or movement with the rotation of the cam blank 25, but in the present instance, it is preferable to provide a template 33 having an edge representing a straight line development of the cam path to be cut on the cam blank, this edge of the template being adapted to cooperate with the tracer 14 as the cam blank is rotated, the tracer thereby being adapted to control the position of the cutter relative to the cam blank according to the rises and falls in the template 33 as the latter is moved relative to the tracer 14. In order to obtain simultaneous synchronous motion of the cam blank 25 and template 33, the latter is mounted on a slide 34 and the slide 34 is mounted on a bracket 35 for simultaneous vertical motion as the cam blank is rotated, the slide 34 being secured to a rack 36 operated by a gear 37 mounted on the cam blank spindle 24, for rotation with the cam blank 25, as will be understood from Figs. 1, 2 and 3.

The cam blank and template supporting bracket 22 is mounted on the carriage or slide 20, so that it may be shifted thereon 90° in order to place the cam blank spindle 24 at right angles to the axis of the cutter 3, as indicated in Figs. 2 and 3, in order that the cam cutting machine may be used for cutting drum cams. In Figs. 2 and 3, the cam blank spindle and tracer are shown in position for cutting a drum cam 25D. The drum cam template 33D is shown as extending at right angles to the plane of the gear 37 as compared with the arrangement shown in Fig. 1, in order to retain the edge of the template in proper cooperative relation with the tracer 14, when the bracket 22 is shifted 90° as is required for cutting the drum cams.

Any suitable tracer 14 may be used but in the present instance it is preferably triangular in cross section as shown in Fig. 3, so as to provide a knife edge arranged to be coextensive with the axis of the tracer spindle, this form of tracer being ordinarily referred to as a zero tracer.

*Compensating means.*—It has been pointed out that when the follower roller for the cam is mounted on a radius arm, its position relative to a plane through the axis of the cam will vary when the roller swings toward and from the axis in edge or face cams or transversely of a central plane in drum cams and consequently, correction for this change must be made in calculating or laying out the cam or by automatic compensating means, such as herein described, in order to provide for accurate tracking of the cam roller.

Correction for change of position of a follower roller on the free end of a radius arm or lever is more important and vital with drum cams, because, as previously pointed out, unless the drum cam roller is reciprocated in a straight line, that is, with its axis in the plane of the axis of the drum cam, the angular position of the face of the roller, relative to the wall of the cam groove, will change and unless the cam groove is undercut or some other provision is made, such as a ball shaped roller being used, the cam will either bind or be unduly loose and therefore be inoperative. The cam groove in a drum cam is usually cut by a cylindrical end mill of substantially the diameter of the follower roller to be used, and during the cutting operation the axis of the cutter, for cutting a truly symmetrical path or groove, should be at right angles to the face of the drum, or in a plane passing through the axis of the drum and hence, radial of the drum. A drum cam with a symmetrical cam groove can operate with a cylindrical follower roller, only when the latter is mounted on a slide reciprocating in an axial plane of the drum cam. However, if the cam follower or roller is mounted on a radius arm, a symmetrical cam groove on a drum cam cannot be used for the cam roller will swing through an arc, according to the radius and sweep of the radius arm. The axis of the roller will therefore, swing above and below an axial or radial plane of the cam and the compensating means of the present improvement is adapted to automatically cut the cam groove of the drum cam displaced to one side or the other of axial or radial planes of the drum cam, so that the face of the cam roller, mounted on the desired radius arm, will always contact with the wall of the cam groove, for the walls of the groove will be parallel to the axis of the roller in every position of the radius arm.

Forming the cam groove in this manner is accomplished by automatically shifting the milling cutter 3 transversely, independently of the cam cutting operation, to compensate for the change of position of the follower through swinging of the radius arm. With this compensation the cutter is made to assume the same positions as those the cam roller will assume when the cam is being used.

To provide for the automatic shift of the axis of the cutter 3, the cutter and its spindle 4 and all the drive gears 7 to 12 and the motor 13 are all mounted on a vertically movable slide or carriage 38, supported on vertical slide-ways 39 on the pier 2, as will be seen in Figs. 1 and 2. A lead screw 40 is provided for moving the cutter carriage 38 on the vertical ways 39, this screw being preferably rotatable through bevel or miter gears 41, connecting it with a shaft 42, adapted to be driven by magnetic clutches 43, cooperating with a clutch armature 44, keyed to the shaft 42 in the usual way. Gearing for driving the magnetic clutches 43 in opposite directions is connected with a continuously rotating motor 45 in the usual way, this type of clutch mechanism being well known.

For automatically controlling the position of the cutter 3, relative to the axis of the cam blank, the position of the cutter carriage 38 is controlled by an auxiliary electric tracer 46 mounted on a bracket 47, secured to the cutter carriage 38 and movable therewith, as indicated in Fig. 1. The auxiliary tracer 46, through suitable electrical connections and relays, shown in Fig. 5, is adapted to control the energization of the respective magnetic clutches 43 for shifting the position of the cutter vertically up or down, under the control of the auxiliary tracer, that is, transversely of the motion between the cutter and cam blank under the control of the cam cutting tracer. A zero tracer point on tracer 46 is adapted to cooperate with the arcuate edge 48 of a radius arm template 49 (see Figs. 1 and 4) secured in any suitable manner to a slide plate 50, mounted on a bracket 51. The bracket 51 is secured by screws 52 and bolts 53 to the front edge of the cam blank supporting table 20 mounted on the reciprocating carriage 17, the latter, as previously pointed out, being adapted to reciprocate during the cutting operation of the cam, in a plane at right angles to the cutter 3, under the control of the cam cutting tracer 14. A thrust screw 54 is mounted in the bracket 51 for engagement with the slide plate 50 for adjusting the latter and varying the elevation of the arcuate edge 48 of the template, for proper cooperative relation with the tracer 46.

It will be understood from the above and as shown in the drawings, that the compensating radius arm template 49 is mounted parallel to the axis of the drum cam and in fixed relation to the latter, and is adapted to be reciprocated with the cam blank or partake of the relative cam cutting motion between the cutter and the cam blank. Similarly, the auxiliary tracer 46 is mounted in fixed relation to the cutter for transverse motion relative to the cam blank 25D and template 49 during the cam cutting operation. The vertical motion of the cutter, under control of the compensating auxiliary tracer, therefore, is at right angles to the cam cutting motion and independent thereof, as previously explained.

In cutting the groove 55 in the drum cam blank 25D, as shown in Fig. 3, it will be noted that the cutter 3 or cam roller, shown at 56, is shown above the dotted line, representing the axis or radial plane of the drum cam blank and is shown at the middle of the cam path, consequently, on the indicated radius arm, the roller will swing an amount below the central axis or through the arc represented by the dotted line 57. It is preferable to arrange the arcuate path 57 symmetrical to an axial plane of the drum. Obviously, the path 57 corresponds with the arcuate edge 48 of the compensating template 49 and to the radius of the radius arm. The dotted line 58, shown as a cord on the template arm 49, represents the relation of the plane of the axis of the drum cam to the arcuate edge 48 of the template generated according to the length of the radius arm.

In Fig. 5, the wiring connections for the auxiliary tracer 46 to raise and lower the axis of the cutter spindle are shown, the electric tracer being substantially the same as that shown and described in the Shaw patent referred to. The wobbling spindle 59 of the tracer 46 is supported for universal movement in a casing or frame 60 and its rear end engages and cooperates with a pivoted contact carrying lever 61, provided with front contacts 62 and rear contacts 63, which are adapted to ground the respective circuits through the machine, as indicated at 64. The front contacts 62 are connected through lead 65 with a relay 66 adapted to operate a spring sustained armature contact bar 67 for closing a contact at 68 a high potential circuit (110 volts) through lead 69 to the magnetic clutch 43, designated S in Fig. 5, the circuit being completed through lead 70 to the L— side of the main line 110 volt circuit.

The back contacts 63 are adapted to close and ground a circuit through lead 71 to relay magnet 72, operating a spring sustained armature contact bar 73 to close contact at 74 with a lead 75 of the high potential circuit to the magnetic clutch 43, marked N in Fig. 5, the circuit being completed through lead 76 to the L— side of the 110 volt circuit. The respective circuits through leads 65 and 71 after leaving the relay magnets 66 and 72, through leads 77 and 78 connect with lead 80 to a switch 81, which when closed, completes the circuit through lead 82 to the low potential generator 83, which is grounded at 84. The positive side of the high potential 110 volt circuit L+ is connected through lead 85, with a switch 86, tied to switch 81 for simultaneous operation therewith, and from the switch 86 passes through lead 87 to a divided connection 88 with the respective contact armatures 67 and 73 to complete the circuits of the respective magnetic clutches 43 when the circuit of one or the other of the relays 66 or 67 is closed by the auxiliary tracer contacts 62 or 63, as the tracer point 46 follows the arcuate edge 48 of the radius arm template of the compensating means, thereby controlling the vertical position of the cutter 3, so that the latter will be successively positioned to follow the exact arc of the radius arm, thereby automatically cutting the cam groove 55, so that the cam follower or roller 56 will track properly on the walls or faces of the cam groove in all positions of the roller as the radius arm swings back and forth from one end of the cam to the other.

Naturally, by compensating for the radius arm motion during the cutting of the cam, greater accuracy is obtained and much time is saved over the old method. With the improved compensating means described, it will be understood that it is a simple matter to arrange the machine for cutting various sizes of cams, the cams being correctly cut and properly compensated for any given radius arm. Also radius arms of various lengths may be compensated for without much trouble by simply changing the arcuate template 49 and substituting a template generated with a radius corresponding to the radius arm to be compensated for.

It will be understood that while the compensating means has been described in connection with a particular form of machine, in which, during the cam cutting operation, the cam blank is reciprocated under the control of a tracer, other machines having equivalent relative motion between the cam blank and cutter may likewise be controlled by the automatic compensating means

We claim:—

1. In a cam cutting machine, a table, means mounted on said table for rotating a cam blank to be cut, a cutter for cutting the cam, means for effecting relative reciprocating motion between the cutter and table during the cutting of the cam, a tracer controlling said reciprocating motion in accordance with a cam template, said template being mounted for motion in unison with rotation of the cam blank, compensating means comprising a carriage upon which said cutter is mounted for motion at right angles to said reciprocating motion, an arcuate template mounted upon said table in fixed relation with the axis of the cam blank and parallel with the direction of reciprocating motion, a tracer mounted on said cutter carriage for cooperation with said arcuate template for controlling the transverse position of the cutter relative to the axis of the cam blank, during said reciprocating motion.

2. The cam cutting machine as in claim 1, wherein magnetic clutches operating said cutter carriage are provided for transversely positioning said cutter, and an electric tracer mounted on said carriage and following the edge of the arcuate template controls said transverse positioning through operation of said magnetic clutches.

3. In a cam cutting machine, the combination of a rotating cutter, means for supporting a cam blank in cooperative relation for said cutter and a pattern of the cam to be cut, means for rotating the cam blank and correspondingly moving the pattern, means including a tracer following the pattern for controlling relative lateral motion of the cutter and cam blank for cutting the cam, compensating means comprising a carriage upon which said rotating cutter is mounted for movement transversely of its axis and at right angles to said relative lateral motion, a template having an arcuate edge located in fixed relation to the axis of the cam blank and a tracer supported on said carriage for cooperation with the arcuate edge of said template for controlling transverse motion of the cutter carriage.

4. The cam cutting machine compensating means as in claim 3, wherein magnetic clutches are provided for effecting the transverse motions of said cutter carriage and an electric tracer following the arcuate edge of said template is adapted to control the transverse motions of said carriage by controlling actuation of said magnetic clutches.

5. A cam cutting machine compensating means, comprising means for supporting and rotating a cam blank, a cutter for cutting the cams, means for effecting relative motion between the cutter and cam blank for cutting the cam, a carriage upon which said cutter is mounted for motion at right angles to said relative motion for positioning the cutter relative to the axis of the cam blank to compensate for the radius arm of the cam follower, a radius arm arcuate template in fixed relation with the axis of the cam blank, and a tracer mounted on said carriage in fixed relation to the cutter for cooperation with said arcuate template to control the position of said cutter according to the radius arm represented by said arcuate template.

6. In a cam cutting machine comprising a support for the cam blank and for a template for controlling the cutting of the cam, a support for the cutter and a support for a tracer to cooperate with the template, means for rotating the cam blank and synchronously moving the template relative to and in cooperation with the tracer, means adapted to be controlled by the tracer following the template for effecting relative motion between the tracer and template between the cutter and cam blank for cutting of the cam according to the template, the combination therewith of radius arm compensating means comprising an auxiliary tracer cooperating with an arcuate template having an edge generated according to the radius arm to be compensated, means for mounting the cutter and said auxiliary tracer for transverse motion at right angles to said relative motion for cutting the cam and means controlled by said auxiliary tracer following the arcuate template for effecting said transverse motion while cutting the cam.

7. A cam cutting machine compensating means, comprising means for rotating a cam blank upon which the cam is to be cut, a pattern of the cam to be cut operatively connected for synchronous motion with the cam blank, a tracer mounted for cooperation with the cam pattern, a cutter mounted in position for cutting the cam on the cam blank, means for effecting relative motion between the cutter and cam blank under the control of the tracer as it follows the pattern for cutting the cam according to the pattern, a radius arm compensating template mounted in fixed relation to the axis of the cam blank, an auxiliary tracer for cooperation with said template mounted in fixed relation to the cutter, said template and auxiliary tracer being subject to the same relative motion effective between the cutter and the cam blank, and means controlled by said auxiliary tracer for moving the auxiliary tracer and the cutter in a plane at right angles to said relative motion for changing the position of the cutter relative to the axis of the cam blank according to the radius arm to be compensated r.

8. The cam cutting machine compensating means as in claim 7, wherein the cutter and said auxiliary tracer are mounted on a carriage mounted for motion in a plane at right angles to said relative motion between the cutter and the cam blank and magnetic clutches are provided for effecting motion of said carriage under control of an electric auxiliary tracer as the latter follows the edge of the compensating template during said relative motion.

9. In a cam cutting machine, the combination of a tracer and cutter, means supporting a template and cam blank, means for rotating the cam blank relative to the cutter and simultaneously moving the template relative to the tracer, means for relatively positioning the cutter and tracer according to and as the tracer follows the template and compensating means comprising an arcuate template representing the path of the radius arm of a cam follower and a tracer cooperating therewith adapted to bodily shift the transverse position of the cutter relative to the axis of the cam blank during the cutting operation.

JOHN C. SHAW.
ROBERT D. SHAW.